(12) United States Patent
Tagawa et al.

(10) Patent No.: US 11,146,182 B2
(45) Date of Patent: Oct. 12, 2021

(54) RECTIFIER AND MOTOR DRIVING DEVICE

(71) Applicant: FANUC CORPORATION, Yamanashi (JP)

(72) Inventors: Takaaki Tagawa, Yamanashi (JP); Shinichi Horikoshi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/887,042

(22) Filed: May 29, 2020

(65) Prior Publication Data

US 2020/0412274 A1    Dec. 31, 2020

(30) Foreign Application Priority Data

Jun. 26, 2019  (JP) .............................. JP2019-118186

(51) Int. Cl.
*H02M 7/5387* (2007.01)
*H02M 7/12* (2006.01)
*H02P 27/06* (2006.01)
*H02M 1/36* (2007.01)
*H02M 1/32* (2007.01)

(52) U.S. Cl.
CPC .......... *H02M 7/5387* (2013.01); *H02M 1/36* (2013.01); *H02M 7/12* (2013.01); *H02P 27/06* (2013.01); *H02M 1/322* (2021.05); *H02P 2201/00* (2013.01)

(58) Field of Classification Search
CPC ........ H02M 7/5387; H02M 1/36; H02M 7/12; H02M 2001/322; H02P 27/06; H02P 7/63; H02P 2201/00
See application file for complete search history.

(56) References Cited

U.S. PATENT DOCUMENTS

| | | | | |
|---|---|---|---|---|
| 10,224,862 B2* | 3/2019 | Kuroki | ................... | H02P 29/68 |
| 2017/0373630 A1* | 12/2017 | Figie | ..................... | G01R 31/52 |
| 2018/0062557 A1* | 3/2018 | Tao | .......................... | H02M 1/00 |
| 2020/0406768 A1* | 12/2020 | Pfeilschifter | ............. | H02J 7/02 |
| 2021/0021205 A1* | 1/2021 | Horikoshi | ............... | H02M 1/34 |

FOREIGN PATENT DOCUMENTS

JP       2017135955 A     8/2017

\* cited by examiner

*Primary Examiner* — Adolf D Berhane
(74) *Attorney, Agent, or Firm* — Studebaker & Brackett PC

(57) ABSTRACT

A rectifier according to an aspect of the present disclosure includes: a bridge circuit that derives a positive voltage component and a negative voltage component from an AC power supply voltage; a smoothing capacitor that smooths an output voltage from the bridge circuit; a pre-charge resistor that is provided between the bridge circuit and the smoothing capacitor, and reduces an inrush current; a charge switch that is provided in parallel with the pre-charge resistor; and a controller that controls the charge switch between an open state and a close state, wherein when application of the AC power supply voltage to the bridge circuit is started, the controller closes the charge switch if a voltage applied between ends of the pre-charge resistor is determined to become equal to or lower than a predetermined resistor threshold voltage.

3 Claims, 3 Drawing Sheets

RECTIFIER AND MOTOR DRIVING DEVICE

This application is based on and claims the benefit of priority from Japanese Patent Application No. 2019-118186, filed on 26 Jun. 2019, the content of which is incorporated herein by reference.

BACKGROUND OF THE INVENTION

Field of the Invention

The present invention relates to a rectifier and a motor driving device.

Related Art

A rectifier is widely used which rectifies an alternating current using a diode bridge and reduces voltage fluctuation using a smoothing capacitor. For example, a motor driving device in practical use includes a rectifier that converts an alternating current into a direct current, and an inverter that re-coverts the direct current outputted from the rectifier into an alternating current having an arbitrary frequency, and thereby drives a motor.

In the rectifier having the above configuration, the smoothing capacitor has not yet been charged immediately after startup, and therefore, a voltage between the ends of the smoothing capacitor is low, resulting in a large difference from an output voltage of the diode bridge. Such a large difference may cause a large inrush current to flow. As a technique to reduce the inrush current, for example, Patent Document 1 proposes a motor driving device including an initial charging unit that has: a switch for opening and closing a current path between an AC/DC converter (diode bridge) and a capacitor (smoothing capacitor); and a charge resistor connected in parallel with the switch. Prior to driving a motor, the switch of the initial charging unit is opened so that the capacitor is charged with a direct current from the AC/DC converter, the direct current flowing through the charge resistor.

In the motor driving device of Patent Document 1, during an initial charging period from a moment immediately after startup of the motor driving device before start of driving the motor, the switch is open (off) so that the direct current outputted from the AC/DC converter flows into the capacitor through the charge resistor, whereby the capacitor is charged. When the capacitor is charged to a specified voltage, the switch is closed (turned on) to short-circuit the ends of the charge resistor, thereby finishing the initial charge operation.

Patent Document 1: Japanese Unexamined Patent Application, Publication No. 2017-135955

SUMMARY OF THE INVENTION

In many cases, adjustment and maintenance of an apparatus including a motor driven by a motor driving device having a rectifier and an inverter are carried out in a state where power supply to the motor driving device is shutoff for safety, by actuating the emergency stop button or turning off the main power switch, for example. When fine adjustment and trial operation of the apparatus are repeated, start and stop of the rectifier are performed frequently.

In the motor driving device of Patent Document 1, bounce occurs at a contact of the switch connected in parallel with the charge resistor when the switch is closed, and arc discharge causes wear of the contact. Therefore, if the start and stop of the motor driving device of Patent Document 1 are frequently repeated, the wear of the contact of the switch may cause trouble. For this reason, there has been a demand for a rectifier and a motor driving device which well endures frequent start and stop.

A rectifier according to an aspect of the present disclosure includes: a bridge circuit that derives a positive voltage component and a negative voltage component from an AC power supply voltage; a smoothing capacitor that smooths an output voltage from the bridge circuit; a pre-charge resistor that is provided between the bridge circuit and the smoothing capacitor and reduces an inrush current; a charge switch that is provided in parallel with the pre-charge resistor; and a controller that controls the charge switch between an open state and a close state. When application of the AC power supply voltage to the bridge circuit is started, the controller closes the charge switch if a voltage applied between ends of the pre-charge resistor is determined to become equal to or lower than a predetermined resistor threshold voltage.

The rectifier according to the aspect of the present disclosure well endures frequent start and stop.

DETAILED DESCRIPTION OF THE INVENTION

Figure 1:
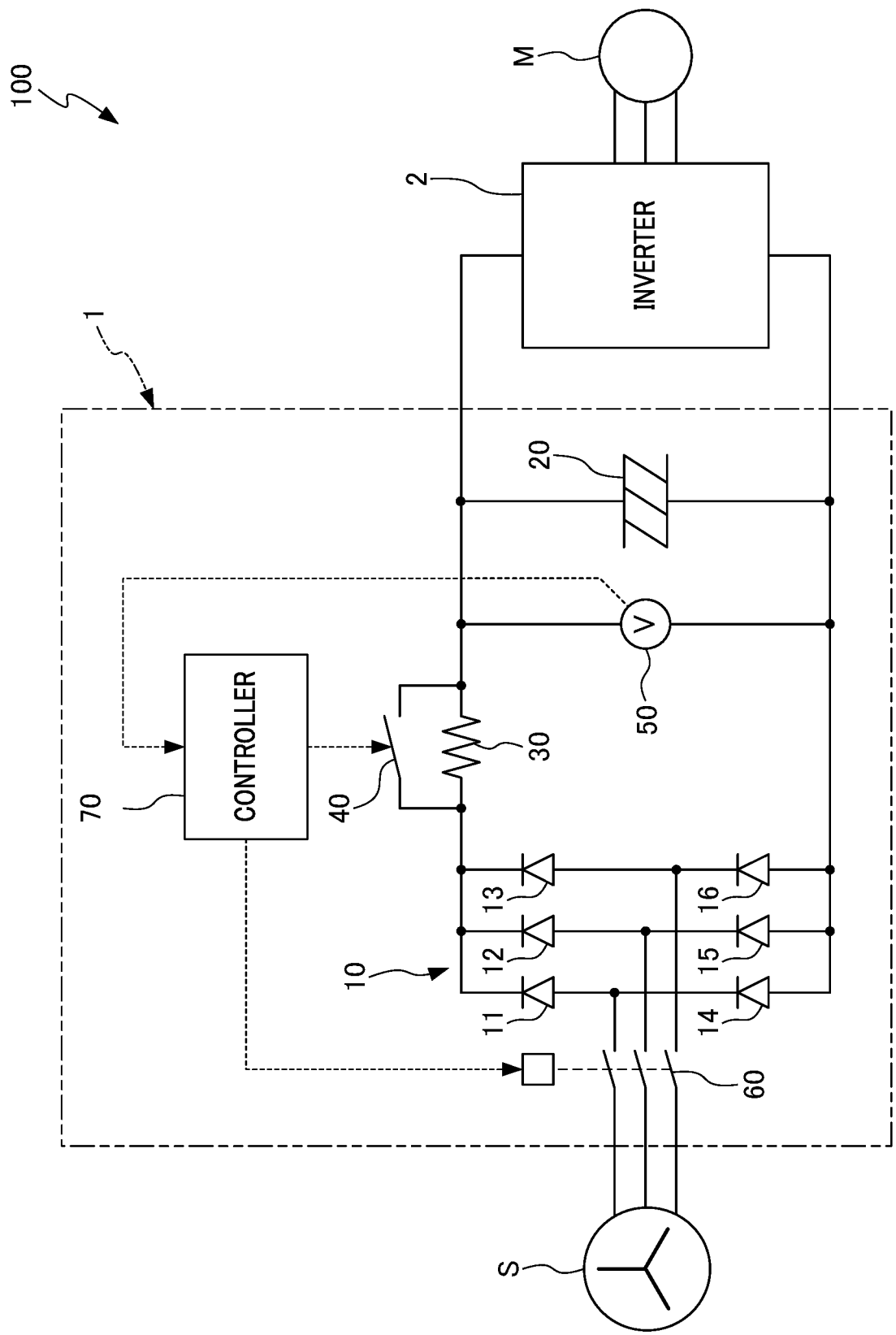
FIG. 1 is a circuit diagram showing a configuration of a motor driving device according to a first embodiment of the present disclosure.

Embodiments of the present disclosure will be described below with reference to the drawings. FIG. 1 is a schematic diagram showing a configuration of a motor driving device 100 according to a first embodiment of the present disclosure.

The motor driving device 100 includes: a rectifier 1 that converts an AC power supply voltage supplied from an AC power supply S into a DC voltage; and an inverter 2 that converts the direct current outputted from the rectifier 1 into an alternating current having an arbitrary frequency, and applies the alternating current to a motor M. The rectifier 1 is an embodiment of the rectifier according to the present disclosure.

The rectifier 1 includes: a bridge circuit 10 that derives a positive voltage component and a negative voltage component from the AC power supply voltage; a smoothing capacitor 20 that smooths an output voltage from the bridge circuit 10; a pre-charge resistor 30 that is provided between the bridge circuit 10 and the smoothing capacitor 20, and reduces an inrush current; a charge switch 40 that is provided in parallel with the pre-charge resistor 30; an output voltage detection circuit 50 that detects a voltage between ends of the smoothing capacitor 20; a power supply switch 60 that applies the AC power supply voltage supplied from the AC power supply S to the bridge circuit 10; and a controller 70 that controls the charge switch 40 between an open state and a close state.

The bridge circuit 10 can be configured as a known three-phase diode bridge circuit that includes diodes 11, 12, 13 for deriving positive voltages of the phases of the AC power supply voltage, and diodes 14, 15, 16 for deriving negative voltages of the phases of the AC power supply voltage. The bridge circuit 10 applies the positive voltage derived by the diodes 11, 12, 13 to one end of the smoothing capacitor 20 through the pre-charge resistor 30 and the charge switch 40, and applies the negative voltage derived by the diodes 14, 15, 16 directly to the other end of the smoothing capacitor 20.

The smoothing capacitor 20 is charged by a current supplied from the bridge circuit 10 due to a voltage difference between the smoothing capacitor 20 and the bridge circuit 10. The smoothing capacitor 20 smooths pulsation of the output voltage from the bridge circuit 10, the pulsation being caused by the waveform of the AC power supply voltage, and outputs the smoothed voltage to the inverter 2.

The pre-charge resistor 30 reduces a large inrush current from flowing to the smoothing capacitor 20 from the bridge circuit 10, the large inrush current being caused by a large voltage difference between the output voltage of the bridge circuit 10 and the voltage of the smoothing capacitor 20 when the smoothing capacitor 20 has not yet been charged at, the time of start.

As will be described later, the charge switch 40 is controlled between the open state and the close state by the controller 70. When the voltage difference between the bridge circuit 10 and the smoothing capacitor 20 becomes small, the charge switch 40 is closed, thereby forming a current path which bypasses the pre-charge resistor 30 and through which a larger current can be supplied from the bridge circuit 10 to the smoothing capacitor 20.

The output voltage detection circuit 50 detects a voltage between ends of the smoothing capacitor 20, that is, the voltage to be outputted to the inverter 2. The output voltage detection circuit 50 inputs, to the controller 70, a detection signal indicating a value of the detected voltage.

The power supply switch 60 is provided on a current path between the AC power supply S and the bridge circuit 10, and opens and closes the current path under control of the controller 70. The power supply switch 60 is preferably, configured as a normally open switch that is in the open state when no signal is inputted from the controller 70.

At the time of starting application of the AC power supply voltage to the bridge circuit 10, the controller 70 closes the charge switch 40 if a voltage applied between the ends of the pre-charge resistor 30 is determined to become equal to or lower than a predetermined resistor threshold voltage. The controller 70 can be implemented by a computer device including a memory, a CPU, an input-output signal interface, etc., and executing an appropriate program. Power for operating the controller 70 is supplied from an upstream side of the power supply switch 60 directly or through a control power supply device.

The controller 70 of the present embodiment determines that the voltage applied between the ends of the pre-charge resistor 30 becomes equal to or lower than the resistor threshold voltage when the value detected by the output voltage detection circuit 50 is equal to or less than a predetermined output threshold. Usually, the voltage of the AC power supply S can be considered to be invariant in this case, since the output voltage of the bridge circuit 10 can also be considered to be constant, there is a correlation between the value detected by the output voltage detection circuit 50 and the voltage applied between the ends of the pre-charge resistor 30. Therefore, setting the output threshold to a value corresponding to the resistor threshold voltage makes it possible to determine whether the voltage applied between the ends of the pre-charge resistor 30 becomes equal to or lower than the resistor threshold voltage.

The controller 70 closes the power supply switch 60 after setting the state of the charge switch 40 according to determination of the voltage between the ends of the pre-charge resistor 30. Specifically, when determining that the voltage applied between the ends of the pre-charge resistor 30 becomes equal to or lower than the resistor threshold voltage, the controller 70 brings the charge switch 40 into the close state, and then closes the power supply switch 60 to start power supply from the bridge circuit 10 to the smoothing capacitor 20. When determining that the voltage applied between the ends of the pre-charge resistor 30 becomes higher than the resistor threshold voltage, the controller 70 brings the charge switch 40 into the open state, and then closes the power supply switch 60 to start power supply from the bridge circuit 10 to the smoothing capacitor 20.

Consequently, for example, when the controller 70 is started in a state where the smoothing capacitor 20 has been charged, such as a state where power is turned on immediately after shutoff of power supply to the motor driving device 100, the controller 70 closes the charge switch 40 before closing the power supply switch 60, so that a current is allowed to flow to the charge switch 40 after bounce of a contact of the charge switch 40 is stopped. This configuration makes it possible to reduce wear of the contact, which wear can be caused by arc discharge occurring when the bounce takes place at the charge switch 40.

The controller 70 maintains the charge switch 40 in the close state until a determination is made that the voltage applied between the ends of the pre-charge resistor 30 has become equal to or higher than the resistor threshold voltage or a separately predetermined threshold. While preventing unnecessary power loss due to Joule loss in the pre-charge resistor 30, this configuration reduces the number of times of opening/closing the charge switch 40, thereby making it possible to reduce the wear of the contact, which wear can be caused by arc discharge accompanied by the bounce taking place at the time of closure of the charge switch 40.

The inverter 2 converts the DC voltage between the ends of the smoothing capacitor 20 into a three-phase AC voltage having an arbitrary frequency. Specifically, the inverter 2 can have a known configuration including a plurality of switching elements for deriving positive and negative voltages from the smoothing capacitor 20 at a different timing for each phase.

As described above, the rectifier 1, which closes, at the time of start, the power supply switch 60 after bringing the charge switch 40 into a suitable state according to determination of the voltage applied between the ends of the pre-charge resistor 30, can reduce the ware of the contact that can be caused by arc discharge occurring when the bounce takes place at the time of closure of the charge switch 40. Thus, the rectifier 1 and the motor driving device 100 including the rectifier 1 well endure frequent start and stop.

Figure 2:
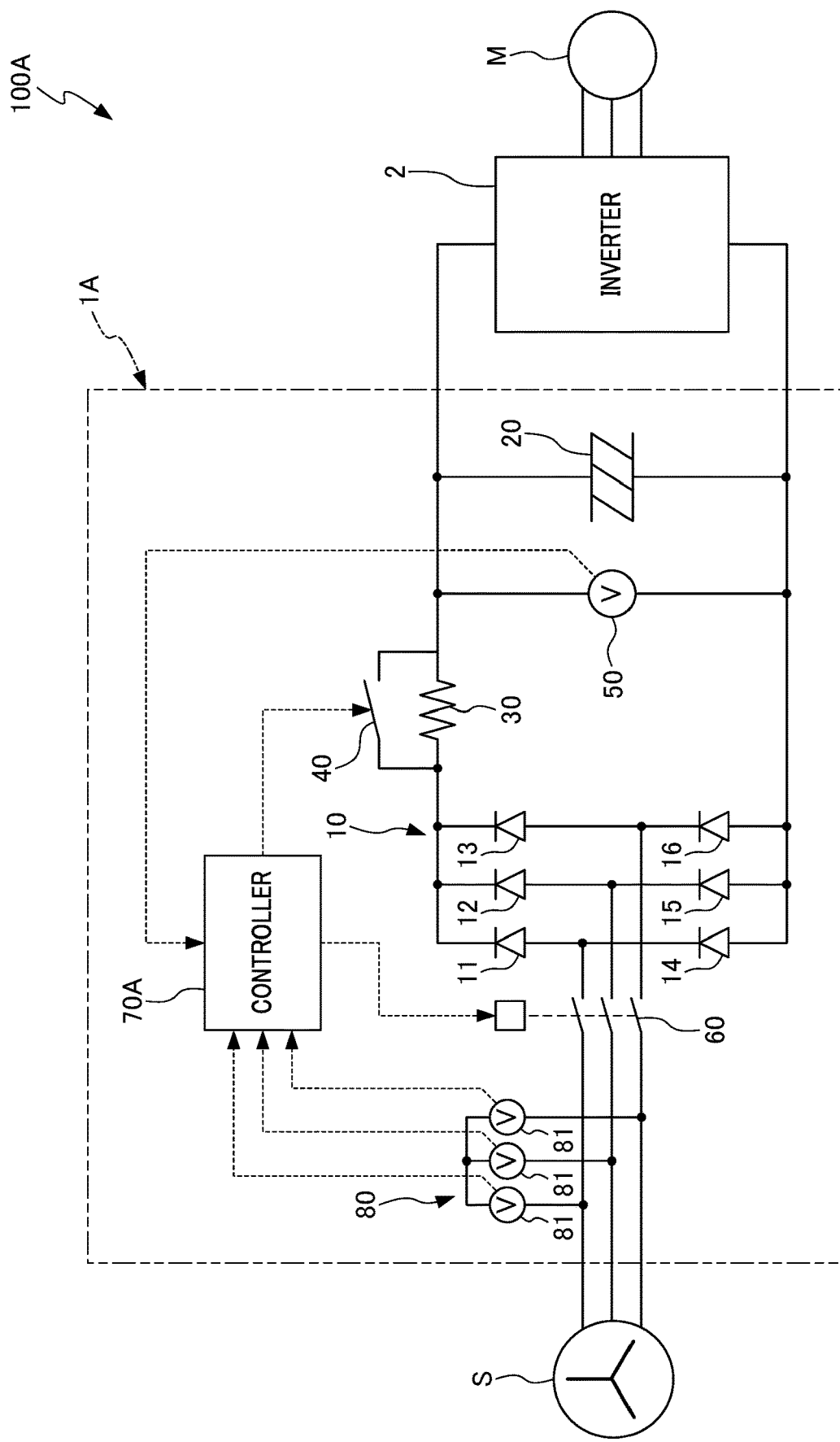
FIG. 2 is a circuit diagram showing a configuration of a motor driving device according to a second embodiment of the present disclosure.

Next, reference is made to FIG. 2 showing a configuration of a motor driving device 100A according to a second embodiment of the present disclosure. In the description of the motor driving device 100A according to the present embodiment, the same components as those of the motor driving device 100 shown in FIG. 1 are denoted by the same reference characters, and description of the same components will not be repeated.

The motor driving device 100A includes: a rectifier 1A that converts an AC power supply voltage supplied from an AC power supply S into a DC voltage; and an inverter 2 that converts the direct current outputted from the rectifier 1A into an alternating current having an arbitrary frequency and applies the alternating current to a motor M. The rectifier 1A is an embodiment of the rectifier according to the present disclosure.

The rectifier 1A includes: a bridge circuit 10 that derives a positive voltage component and a negative voltage component from the AC power supply voltage; a smoothing capacitor 20 that smooths an output voltage from the bridge circuit 10; a pre-charge resistor 30 that is provided between the bridge circuit 10 and the smoothing capacitor 20, and reduces an inrush current; a charge switch 40 that is provided in parallel with the pre-charge resistor 30; an output voltage detection circuit 50 that detects a voltage between ends of the smoothing capacitor 20; a power supply switch 60 that applies the AC power supply voltage supplied from the AC power supply S to the bridge circuit 10; a power supply voltage detection circuit 80 that detects a voltage of the AC power supply voltage; and a controller 70A that controls the charge switch 40 between an open state and a close state.

The power supply voltage detection circuit 80 is provided between the AC power supply S and the power supply switch 60. The power supply voltage detection circuit 80 can have a plurality of phase voltage detectors 81 for detecting voltages of the phases of the AC power supply voltage. The values detected by the power supply voltage detection circuit 80 may be effective values or peak values.

At the time of starting application of the AC power supply voltage to the bridge circuit 10, the controller 70A closes the charge switch 40 if a voltage applied between the ends of the pre-charge resistor 30 is determined to become equal to or lower than a predetermined resistor threshold voltage. The controller 70A can be implemented by a computer device including a memory, a CPU, an input-output signal interface, etc., and executing an appropriate program. Power for operating the controller 70A is supplied from an upstream side of the power supply switch 60 directly or through a control power supply device.

The controller 70A of the present embodiment determines that the voltage applied between the ends of the pre-charge resistor 30 becomes equal to or lower than the resistor threshold voltage when a difference between the value detected by the output voltage detection circuit 50 and the value detected by the power supply voltage detection circuit 80 is equal to or less than a predetermined difference threshold.

In the present embodiment, even when the AC power supply voltage supplied from the AC power supply S varies, the voltage applied to the pre-charge resistor 30 can be determined accurately. This feature makes it possible to achieve appropriate switching between reduction of an inrush current by the pre-charge resistor 30 and reduction of the wear of the contact of the charge switch 40.

Figure 3:
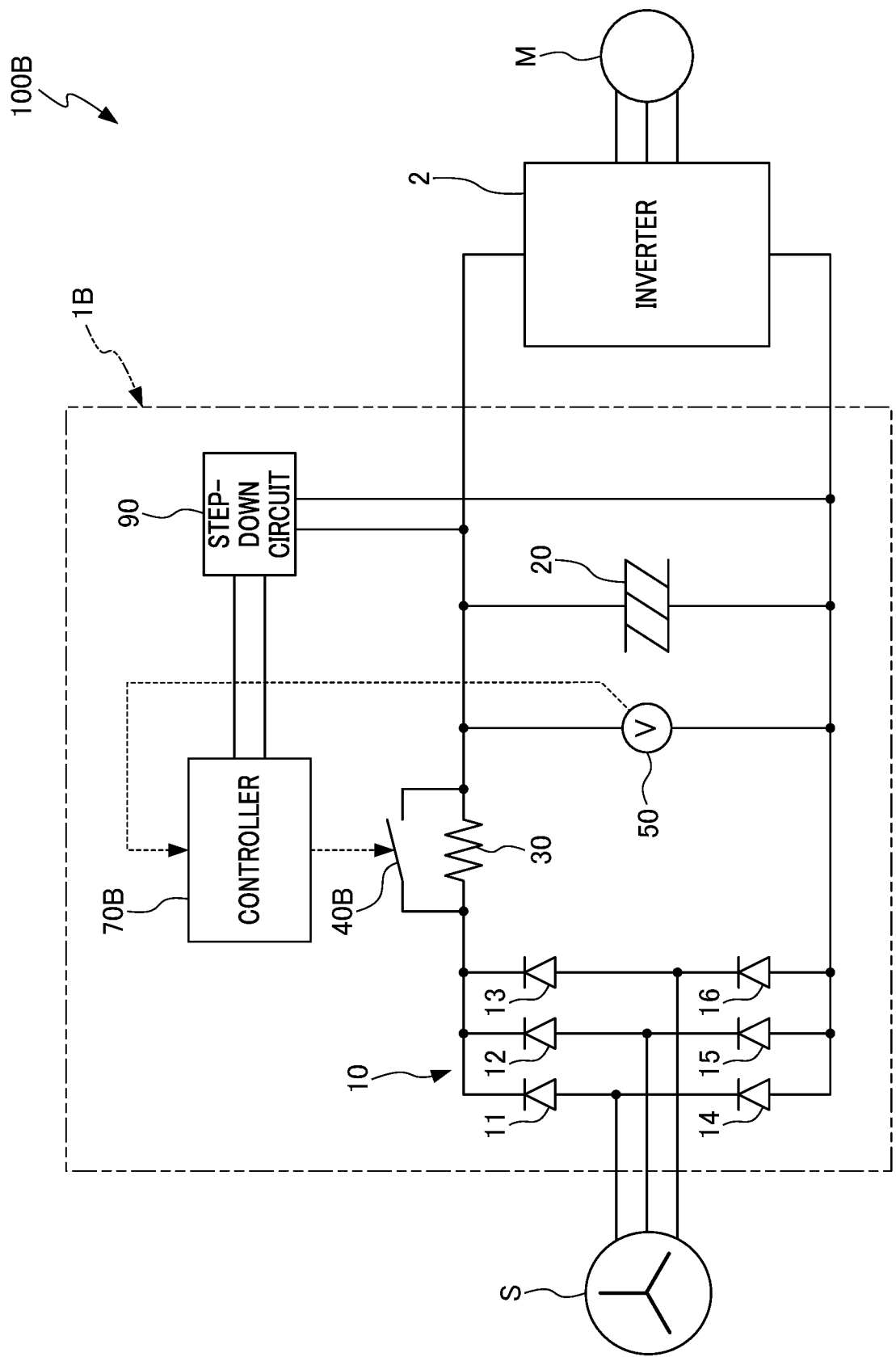
FIG. 3 is a circuit diagram showing a configuration of a motor driving device according to a third embodiment of the present disclosure.

Reference is further made to FIG. 3 showing a configuration of a motor driving device 100B according to a third embodiment of the present disclosure. In the description of the motor driving device 100B according to the present embodiment, the same components as those of the motor driving device 100 shown in FIG. 1 are denoted by the same reference characters, and description of the same components will not be repeated.

The motor driving device 100B includes: a rectifier 1B that converts an AC power supply voltage supplied from an AC power supply S into a DC voltage; and an inverter 2 that converts the direct current outputted from the rectifier 1B into an alternating current having an arbitrary frequency and applies the alternating current to a motor M. The rectifier 1B is an embodiment of the rectifier according to the present disclosure.

The rectifier 1B includes: a bridge circuit 10 that derives a positive voltage component and a negative voltage component from the AC power supply voltage; a smoothing capacitor 20 that smooths an output voltage from the bridge circuit 10; a pre-charge resistor 30 that is provided between the bridge circuit 10 and the smoothing capacitor 20, and reduces an inrush current; a charge switch 40B that is provided in parallel with the pre-charge resistor 30; an output voltage detection circuit 50 that detects a voltage between ends of the smoothing capacitor 20; a controller 70B that controls the charge switch 40B between an open state and a close state; a step-down circuit 90 that reduces the output voltage of the smoothing capacitor 20 to a predetermined voltage and supplies the reduced voltage to the controller 70B. In the rectifier 1B of the present embodiment, the AC power supply S is directly connected to the bridge circuit 10 without any power supply switch interposed therebetween.

The charge switch 40B is a normally open relay that closes only while a signal from the controller 70B is inputted.

At the time of starting application of the AC power supply voltage to the bridge circuit 10, the controller 70B closes the charge switch 40B if a voltage applied between the ends of the pre-charge resistor 30 is determined to become equal to or lower than a predetermined resistor threshold voltage. The controller 70B can be implemented by a computer device including a memory, a CPU, an input-output signal interface, etc., and executing an appropriate program. Power for operating the controller 70B is supplied from the step-down circuit 90.

The controller 70B of the present embodiment determines that the voltage applied between the ends of the pre-charge resistor 30 becomes equal to or lower than the resistor threshold voltage when a value detected by the output voltage detection circuit 50 is lower than a predetermined output threshold Cr when power is being supplied from the step-down circuit 90. Specifically, the controller 70B is configured such that: when the value detected by the output voltage detection circuit 50 is equal to or lower than the predetermined output threshold, the controller 70B actively opens the charge switch 40B by stopping outputting a control signal; and when power supply from the step-down circuit 90 is stopped, the controller 70B allows the charge switch 40 to open by becoming unable to output the control signal for closing the charge switch 40.

The step-down circuit 90 is a circuit that reduces the output voltage of the smoothing capacitor 20 to an operating voltage of the controller 70B. The step-down circuit 90 is configured to output a voltage that enables the controller 70B to continue performing the control during at least a period in which the voltage applied between the ends of the pre-charge resistor 30 is higher than the resistor threshold voltage in a case where application of the AC power supply voltage from the AC power supply S to the bridge circuit 10 is resumed after stop of the application of the AC power supply voltage.

As can be seen, the controller 70B, which opens and closes the charge switch 40 in accordance with the voltage between the ends of the smoothing capacitor 20, maintains the charge switch 40 in the close state if supply of the AC power supply voltage is resumed before the smoothing capacitor 20 discharges a certain amount of power following shutoff of the AC power supply voltage. Thus, the controller 70B can reduce the wear of the contact that can be caused by bounce at the charge switch 40. Further, the controller 70B restarts while having the charge switch 40 open when the supply of the AC power supply voltage is resumed after the smoothing capacitor 20 has discharged a certain amount of power following shutoff of the AC power supply voltage. Thus, the controller 70B can effectively reduce the inrush current, by charging the smoothing capacitor 20 through the pre-charge resistor 30.

The embodiments of the rectifier and the motor driving device according to the present disclosure have been described in the foregoing however, the rectifier and the motor driving device according to the present disclosure are not limited to the embodiments described above. The effects described in the above embodiments of the rectifier and the motor driving device are merely the most preferable effects exerted by the rectifier and the motor driving device according to the present disclosure. The effects exerted by the rectifier and the motor driving device according to the present disclosure are not limited to those described in the above embodiments.

The rectifier according to the present, disclosure may be used to supply a DC voltage to an electric circuit other than the inverter. Further, for example, the rectifier according to the present disclosure may include, in the bridge circuit, a switching device which can cause a current to flow in the reverse direction with respect to the diodes, and may have a function to convert a DC voltage supplied in the reverse direction from the output end of the smoothing capacitor into an AC voltage that is in sync with the AC power supply voltage, and to regenerate the AC voltage in the AC power supply. Thus, the inverter in the motor driving device according to the present disclosure may be configured to function as a rectifier that converts an AC voltage supplied in the reverse direction from a motor into a DC voltage while the motor is utilized as a generator.

EXPLANATION OF REFERENCE NUMERALS

1, 1A, 1B: Rectifier
2: Inverter
10: Bridge Circuit
20: Smoothing Capacitor
30: Pre-charge Resistor
40, 40B: Charge Switch
50: Output Voltage Detection. Circuit
60: Power Supply Switch
70, 70A, 70B: Controller
80: Power Supply Voltage Detection Circuit
90: Step-down Circuit
100, 100A, 100B: Motor Driving Device
M: Motor
S: AC Power Supply

What is claimed is:

1. A rectifier comprising:
    a bridge circuit that derives a positive voltage component and a negative voltage component from an AC power supply voltage;
    a smoothing capacitor that smooths an output voltage from the bridge circuit;
    a pre-charge resistor that is provided between the bridge circuit and the smoothing capacitor and reduces an inrush current;
    a charge switch that is provided in parallel with the pre-charge resistor;
    a controller that controls the charge switch between an open state and a close state;
    an output voltage detection circuit that detects a voltage between ends of the smoothing capacitor; and
    a power supply voltage detection circuit that detects a voltage of the AC power supply voltage, wherein
    when application of the AC power supply voltage to the bridge circuit is started, the controller closes the charge switch if a voltage applied between ends of the pre-charge resistor is determined to become equal to or lower than a predetermined resistor threshold voltage, and
    the controller determines that the voltage applied between the ends of the pre-charge resistor becomes equal to or lower than a resistor threshold voltage when a difference between a value detected by the output voltage detection circuit and a value detected by the power supply voltage detection circuit is equal to or less than a predetermined difference threshold.

2. The rectifier according to claim 1, further comprising:
    a power supply switch that applies the AC power supply voltage to the bridge circuit, wherein
    the controller closes the power supply switch after setting the state of the charge switch.

3. A motor driving device comprising:
    the rectifier according to claim 1; and
    an inverter that converts an output from the rectifier into an alternating current.

* * * * *